United States Patent
Saito

(10) Patent No.: US 11,444,291 B2
(45) Date of Patent: Sep. 13, 2022

(54) GAS DIFFUSION LAYER

(71) Applicant: TOYOTA JIDOSHA KABUSHIKI KAISHA, Toyota (JP)

(72) Inventor: Takeaki Saito, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 135 days.

(21) Appl. No.: 16/267,831

(22) Filed: Feb. 5, 2019

(65) Prior Publication Data
US 2019/0273267 A1  Sep. 5, 2019

(30) Foreign Application Priority Data
Mar. 1, 2018 (JP) .............................. JP2018-036306

(51) Int. Cl.
- *H01M 8/0234* (2016.01)
- *H01M 8/026* (2016.01)
- H01M 8/10 (2016.01)

(52) U.S. Cl.
CPC ......... *H01M 8/0234* (2013.01); *H01M 8/026* (2013.01); *H01M 2008/1095* (2013.01)

(58) Field of Classification Search
CPC .............. H01M 8/0234; H01M 8/026; H01M 2008/1095; H01M 8/0245; H01M 8/0243; H01M 8/0239

See application file for complete search history.

(56) References Cited

U.S. PATENT DOCUMENTS

| | | | | |
|---|---|---|---|---|
| 2003/0059662 | A1* | 3/2003 | Debe | H01M 8/0263 429/514 |
| 2007/0072048 | A1* | 3/2007 | Hongo | H01M 8/04186 429/513 |
| 2009/0117433 | A1* | 5/2009 | Yamamoto | H01M 8/0234 429/494 |

(Continued)

FOREIGN PATENT DOCUMENTS

| | | |
|---|---|---|
| CN | 106104877 A | 11/2016 |
| JP | 2004-296176 | 10/2004 |

(Continued)

OTHER PUBLICATIONS

Gostick, Jeff T., et al. "In-plane and through-plane gas permeability of carbon fiber electrode backing layers." Journal of Power Sources 162.1 (2006): 228-238. (Year: 2006).*

(Continued)

*Primary Examiner* — Jimmy Vo
(74) *Attorney, Agent, or Firm* — Finnegan, Henderson, Farabow, Garrett & Dunner, LLP

(57) ABSTRACT

To provide a gas diffusion layer that allows reducing an increase in contact resistance with a separator and also allows reducing deterioration of gas diffusivity. The gas diffusion layer is disposed in contact with a separator including a grooved fluid flow passage. The gas diffusion layer includes a diffusion layer substrate and a water-repellent layer. The diffusion layer substrate has a ratio of a pore diameter to a thickness of 0.35 or more. The water-repellent layer is disposed on a surface of the diffusion layer substrate. The diffusion layer substrate is made of a carbon fiber. A content rate of the carbon fiber is 30% or more.

3 Claims, 5 Drawing Sheets

(56) References Cited

U.S. PATENT DOCUMENTS

| | | | | |
|---|---|---|---|---|
| 2012/0276335 | A1* | 11/2012 | Hong | H01M 8/0243 |
| | | | | 428/143 |
| 2014/0127606 | A1* | 5/2014 | Kuwata | H01M 4/8642 |
| | | | | 429/480 |
| 2014/0370416 | A1* | 12/2014 | Alhazmi | G06F 30/20 |
| | | | | 429/492 |
| 2016/0365582 | A1 | 12/2016 | Kato et al. | |

FOREIGN PATENT DOCUMENTS

| | | |
|---|---|---|
| JP | 2009-211928 | 9/2009 |
| JP | 2009-234851 | 10/2009 |
| JP | 2016-006799 A | 1/2016 |
| JP | 2017-130364 | 7/2017 |

OTHER PUBLICATIONS

Caston, Terry B., Andrew R. Murphy, and Tequila AL Harris. "Effect of weave tightness and structure on the in-plane and through-plane air permeability of woven carbon fibers for gas diffusion layers." Journal of power sources 196.2 (2011): 709-716. (Year: 2011).*

Pharoah, J. G. "On the permeability of gas diffusion media used in PEM fuel cells." Journal of Power Sources 144.1 (2005): 77-82. (Year: 2005).*

* cited by examiner

GAS DIFFUSION LAYER

CROSS REFERENCE TO RELATED APPLICATIONS

The present application claims priority from Japanese patent application JP 2018-036306 filed on Mar. 1, 2018, the content of which is hereby incorporated by reference into this application.

BACKGROUND

Technical Field

The present disclosure relates to a gas diffusion layer used for a fuel cell.

Background Art

A fuel cell is configured by stacking a plurality of cells for fuel cell and generates electricity through electrochemical reaction between supplied oxidizing gas and fuel gas. For example, as described in JP 2017-130364 A, there has been known a cell for fuel cell that includes a Membrane Electrode & Gas Diffusion Layer Assembly including an electrolyte membrane, a pair of electrodes, and a pair of gas diffusion layers, and a pair of separators using an expanded metal. The use of the expanded metal as a fluid flow passage disposed in the separator in the cell for fuel cell having such structure ensures securing gas diffusivity to some extent and therefore ensures the thinned gas diffusion layers.

SUMMARY

However, when the separator using the expanded metal is exchanged for a separator including a grooved fluid flow passage, since the above-described cell for fuel cell employs the thin gas diffusion layers, this causes a problem of poor contact between the gas diffusion layer and the separator, resulting in an increased contact resistance between the gas diffusion layer and the separator. Although countermeasure of thickening the gas diffusion layers is assumed to solve this problem, this deteriorates the gas diffusivity due to the thickened gas diffusion layers, involving another problem of deterioration of a power generation performance of the cell for fuel cell.

The present disclosure has been made to solve such a technical problem, and the present disclosure provides a gas diffusion layer that allows reducing an increase in contact resistance with a separator and also allows reducing deterioration of gas diffusivity.

A gas diffusion layer according to the present disclosure is disposed in contact with a separator including a grooved fluid flow passage. The gas diffusion layer includes a diffusion layer substrate that has a ratio of a pore diameter to a thickness of 0.35 or more.

Since the gas diffusion layer according to the present disclosure includes the diffusion layer substrate with the ratio of the pore diameter to the thickness of 0.35 or more, the thickness of the gas diffusion layer can be secured and the pore diameter can be increased at the same time. Accordingly, the increase in contact resistance between the gas diffusion layer and the separator can be reduced, and the deterioration of the gas diffusivity can be reduced.

In the gas diffusion layer according to the present disclosure, the diffusion layer substrate may include a conductive carbon fiber. A content rate of the conductive carbon fiber is 30% or more. With this configuration, strength of the diffusion layer substrate can be secured.

In the gas diffusion layer according to the present disclosure, the conductive carbon fiber may be a carbon fiber. Thus, use of excellent mechanical properties and conductive property of the carbon fiber ensures reducing the increase in contact resistance with the separator while enhancing the strength of the diffusion layer substrate.

The present disclosure allows reducing the increase in contact resistance with the separator and also allows reducing the deterioration of gas diffusivity.

DETAILED DESCRIPTION

Figure 1:
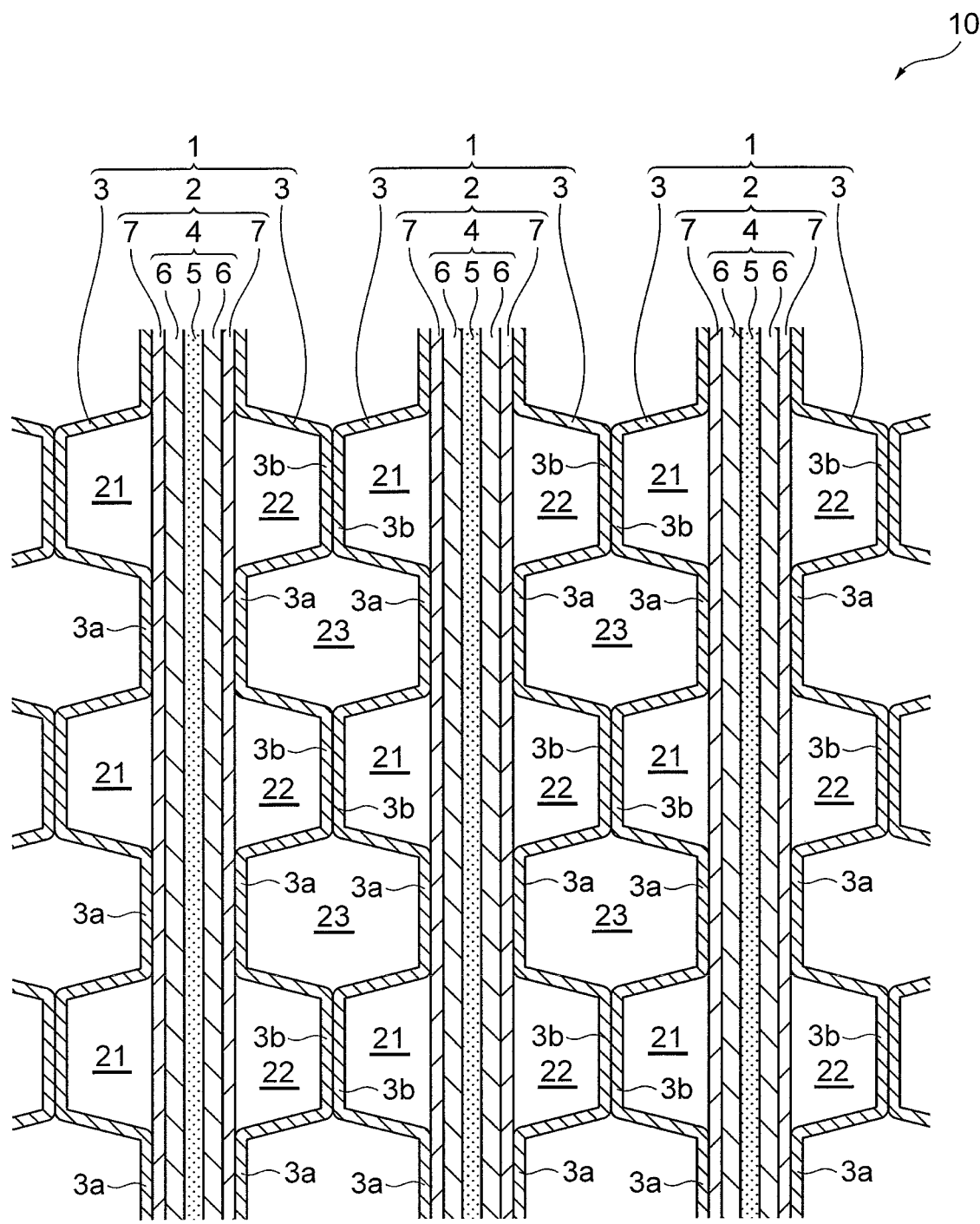
FIG. 1 is a schematic cross-sectional view illustrating a main part of a fuel cell including gas diffusion layers according to an embodiment.

Prior to a description of an embodiment of gas diffusion layers according to the present disclosure with reference to the drawings, the following briefly describes a structure of a fuel cell including the gas diffusion layers with reference to FIG. 1.

FIG. 1 is a schematic cross-sectional view illustrating a main part of the fuel cell including the gas diffusion layers according to the embodiment. As illustrated in FIG. 1, a plurality of cells for fuel cell 1 as a basic unit are stacked in a fuel cell 10. The cell for fuel cell 1 is a solid polymer fuel cell that generates an electromotive force through an electrochemical reaction between oxidizing gas (for example, air) and fuel gas (for example, hydrogen gas). This cell for fuel cell 1 includes a Membrane Electrode & Gas Diffusion Layer Assembly (MEGA) 2 and a pair of separators 3, 3 between which the MEGA 2 is sandwiched.

The MEGA 2 is formed of integrated Membrane Electrode Assembly (MEA) 4 and gas diffusion layers 7, 7, which are disposed on both surfaces of the MEA 4. The MEA 4 includes an electrolyte membrane 5 and a pair of electrodes 6, 6 joined such that the electrolyte membrane 5 is sandwiched therebetween. The electrolyte membrane 5 is formed of a proton-conductive ion exchange membrane made of a solid polymer material. The electrode 6 is made of, for example, a porous carbon material supporting a catalyst such as platinum. The electrode 6 disposed at one side of the electrolyte membrane 5 serves as an anode electrode, and the electrode 6 at the other side serves as a cathode electrode. The gas diffusion layer 7 is a structure to uniformly supply the oxidizing gas or the fuel gas to the electrode 6. The details of the gas diffusion layer 7 will be described later.

The MEGAs 2 constitute power generation units of the fuel cell 10, and the separators 3 are disposed in contact with the gas diffusion layers 7 of the MEGA 2. The separator 3 is shaped like a wave by repetition of recessed portions 3a and projecting portions 3b in alternation. The recessed portions 3a have planar bottom portions in surface contact with the gas diffusion layer 7 of the MEGA 2. Meanwhile, the projecting portions 3b also have planar tops in surface contact with tops of the projecting portions 3b at the adjacent separator 3.

As illustrated in FIG. 1, the one gas diffusion layer 7 among the pair of gas diffusion layers 7, 7 defines grooved fuel gas flow passages 21, through which the fuel gas flows, together with the projecting portions 3b at the adjacent separator 3. The other gas diffusion layer 7 defines grooved oxidizing gas flow passages 22, through which the oxidizing gas flows, together with the projecting portions 3b at the adjacent separator 3. The fuel gas flow passages 21 and the oxidizing gas flow passages 22 are equivalent to "fluid flow passage" each described in the claims.

The cells for fuel cell 1 are stacked with one another in which the anode electrode 6 of one cell for fuel cell 1 faces the cathode electrode 6 of the other adjacent cell for fuel cell 1. This forms spaces 23 between the grooved recessed portions 3a at the adjacent separators 3. This space 23 serves as a coolant flow passage through which a coolant flows and is equivalent to "fluid flow passage" described in the claims.

Figure 2:
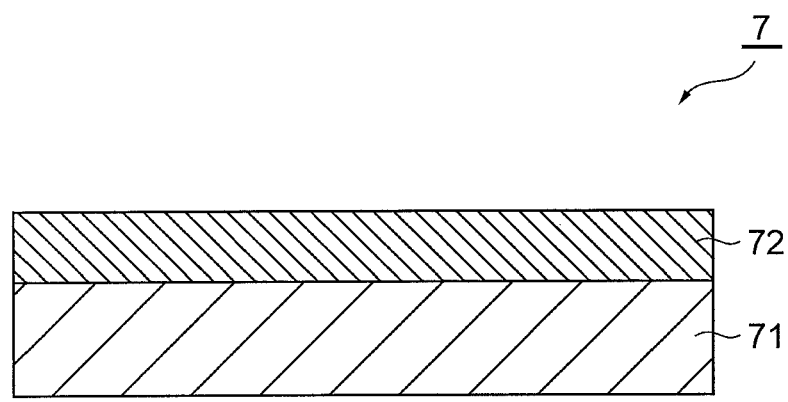
FIG. 2 is a schematic cross-sectional view illustrating a structure of the gas diffusion layer according to the embodiment.

FIG. 2 is a schematic cross-sectional view illustrating a structure of the gas diffusion layer according to the embodiment. As illustrated in FIG. 2, the gas diffusion layer 7 includes a porous diffusion layer substrate 71 having a conductive property and gas diffusivity and a water-repellent layer 72 disposed on the surface of this diffusion layer substrate 71. The diffusion layer substrate 71 is, for example, formed into a sheet shape with, for example, conductive carbon fiber and thermoplastic resin. Examples of the conductive carbon fiber include a carbon fiber, a carbon paper, and a carbon cloth. This embodiment uses the carbon fiber as the conductive carbon fiber. The carbon fiber may be a PAN-based carbon fiber or may be a pitch-based carbon fiber.

The water-repellent layer 72 is made of, for example, conductive particles such as a carbon black, high molecules such as polytetrafluoroethylene (PTFE), and an additive such as cerium oxide. The gas diffusion layer 7 thus constituted is disposed such that the diffusion layer substrate 71 faces the separator 3 side and the water-repellent layer 72 faces the electrode 6 side.

In this embodiment, a ratio of a pore diameter to a thickness (pore diameter/thickness) of the diffusion layer substrate 71 is 0.35 or more. In the diffusion layer substrate 71, a ratio of a normal air permeability to an in-plane air permeability (normal air permeability/in-plane air permeability) is set to $45 \times 10^6$ or more. Further, a content rate of the carbon fiber in the diffusion layer substrate 71 is set to 30% or more. The following describes grounds for the respective settings with reference to FIG. 3 to FIG. 5.

Figure 3:
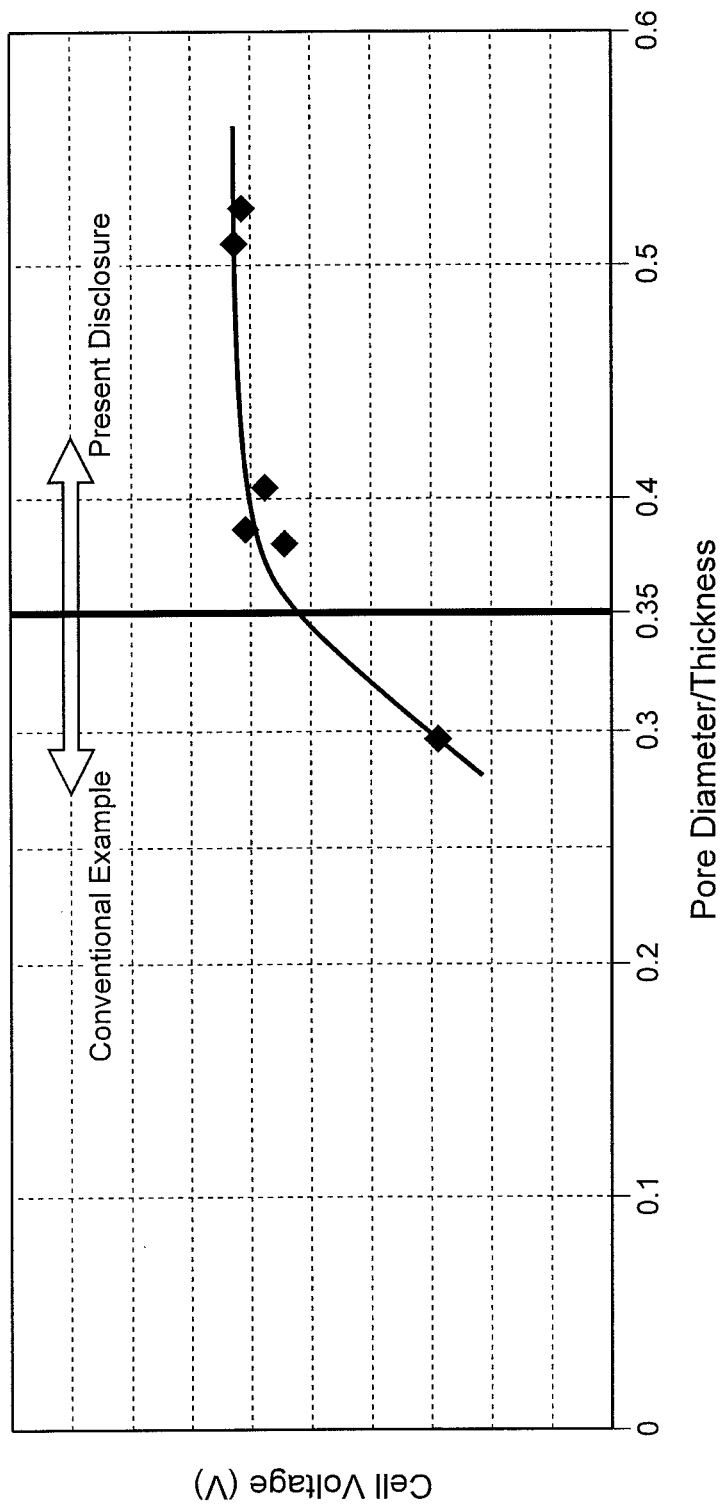
FIG. 3 is a drawing illustrating a relationship between a ratio of a pore diameter to a thickness in a diffusion layer substrate and a cell voltage.

FIG. 3 is a drawing illustrating a relationship between the ratio of the pore diameter to the thickness of the diffusion layer substrate and a cell voltage. As illustrated in FIG. 3, conventionally, an application of a separator using an expanded metal to a separator including a grooved fluid flow passage increases the thickness of the diffusion layer substrate. This decreases the ratio of the pore diameter to the thickness and lowers the cell voltage (namely, a power generation performance of the cell for fuel cell). On the other hand, even when the application of the separator using the expanded metal to the separator including the grooved fluid flow passage increases the thickness of the diffusion layer substrate, the present disclosure featuring the ratio of the pore diameter to the thickness of 0.35 or more can maintain the high cell voltage, thereby ensuring improving the power generation performance of the cell for fuel cell.

Figure 4:
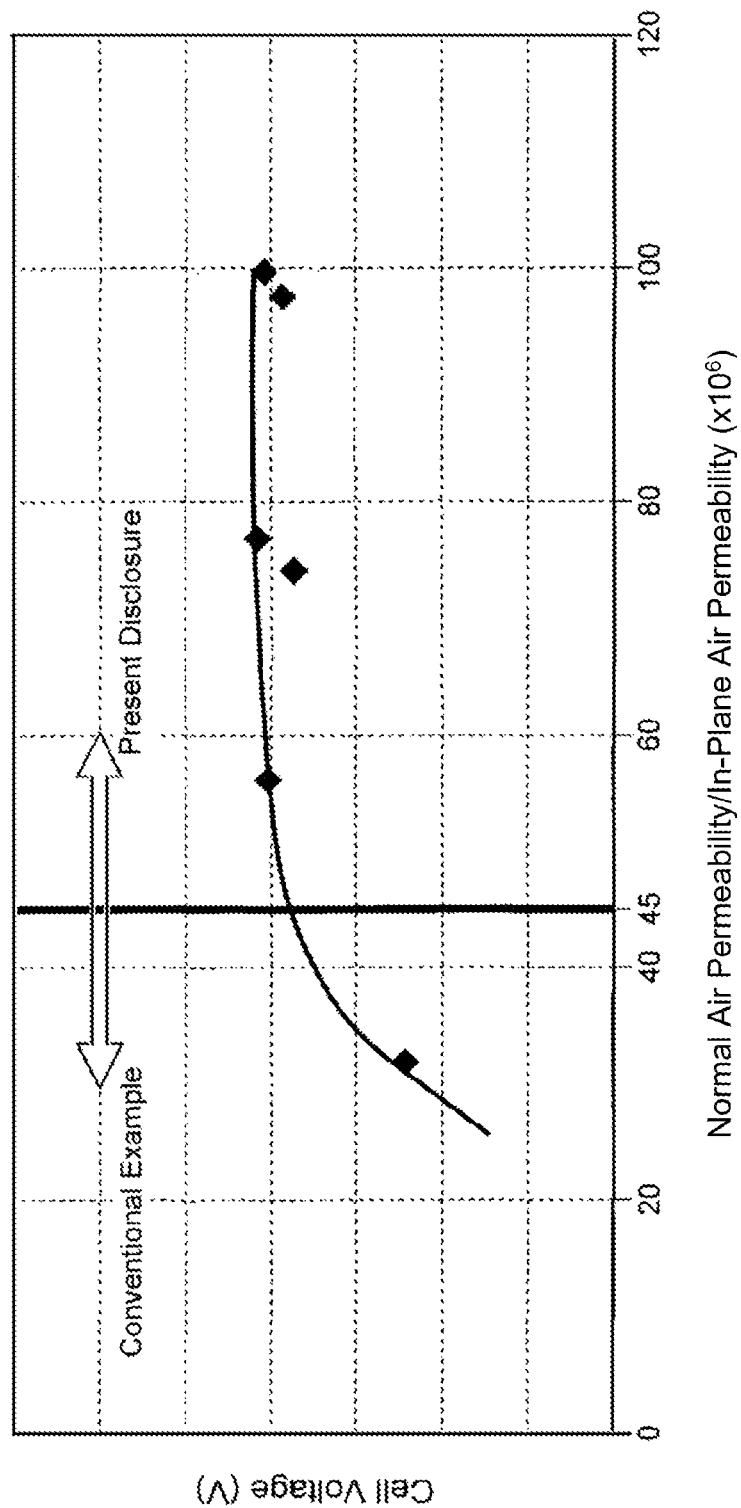
FIG. 4 is a drawing illustrating a relationship between a ratio of a normal air permeability to an in-plane air permeability of the diffusion layer substrate and the cell voltage.

FIG. 4 is a drawing illustrating a relationship between the ratio of the normal air permeability to the in-plane air permeability of the diffusion layer substrate and the cell voltage. Here, the normal air permeability represents air permeability of the diffusion layer substrate in the thickness direction and the in-plane air permeability represents the air permeability of the diffusion layer substrate in the planar direction.

As illustrated in FIG. 4, conventionally, the application of the separator using the expanded metal to the separator including the grooved fluid flow passage decreases the ratio of the normal air permeability to the in-plane air permeability accompanied by the decrease in the ratio of the pore diameter to the thickness, resulting in the deterioration of the power generation performance of the cell for fuel cell. On the other hand, even when the application of the separator using the expanded metal to the separator including the grooved fluid flow passage increases the thickness of the diffusion layer substrate, the present disclosure featuring the ratio of the normal air permeability to the in-plane air permeability of $45 \times 10^6$ or more can improve the power generation performance of the cell for fuel cell.

With the ratio of the pore diameter to the thickness of the diffusion layer substrate of 0.35 or more and the ratio of the normal air permeability to the in-plane air permeability of the diffusion layer substrate of $45 \times 10^6$ or more, deterioration of mechanical strength of the gas diffusion layer is concerned. In response to this, adjusting the proportion of the carbon fiber (that is, the content rate of the carbon fiber) in the diffusion layer substrate allows reducing the deterioration of mechanical strength of the gas diffusion layer.

Figure 5:
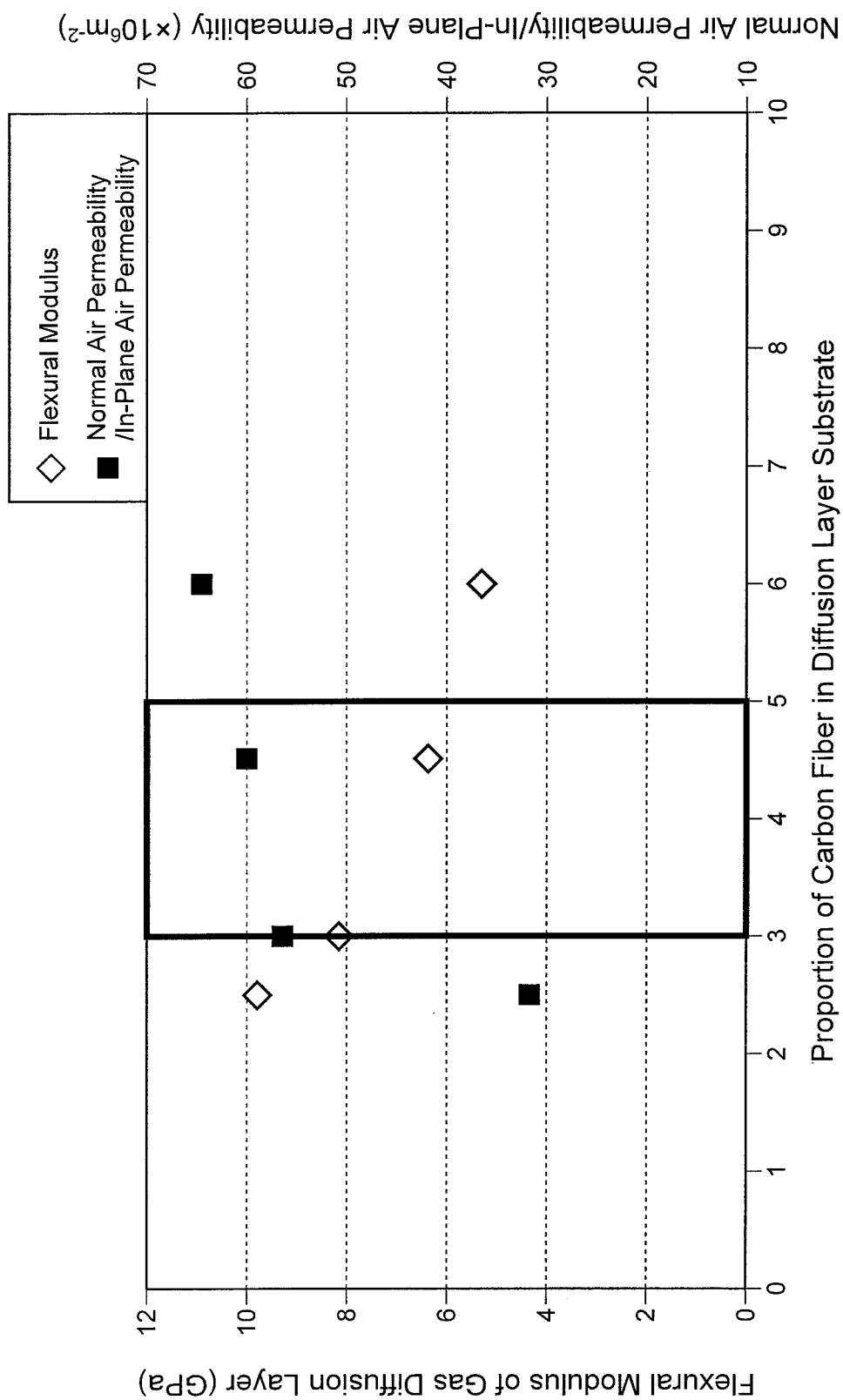
FIG. 5 is a drawing illustrating a relationship between a proportion of a carbon fiber in the diffusion layer substrate, a flexural modulus of the gas diffusion layer, and the ratio of the normal air permeability to the in-plane air permeability.

That is, as illustrated in FIG. 5, the content rate of the carbon fiber in the diffusion layer substrate of 30% or more lowers the flexural modulus of the gas diffusion layer; therefore, the mechanical strength of the gas diffusion layer can be secured. Here, the range of the content rate of the carbon fiber in the diffusion layer substrate may be 30% to 50% (see the area surrounded by the rectangle in FIG. 5). This ensures securing improvement in the power generation performance of the cell for fuel cell while securing the mechanical strength of the gas diffusion layer.

Since the gas diffusion layer 7 of this embodiment includes the diffusion layer substrates 71 with the ratio of the pore diameter to the thickness of 0.35 or more, the thickness of the gas diffusion layer 7 can be secured and the pore diameter can be increased at the same time. Accordingly, the increase in contact resistance between the gas diffusion layer 7 and the separator 3 can be reduced, and the deterioration of the gas diffusivity can be reduced. Additionally, with the ratio of the normal air permeability to the in-plane air permeability of the diffusion layer substrate 71 of $45 \times 10^6$ or more, the power generation performance of the cell for fuel cell 1 can be improved even when the thickness of the diffusion layer substrate 71 is increased. Further, the content rate of the carbon fiber of 30% or more allows securing the strength of the diffusion layer substrate 71, in other words, the strength of the gas diffusion layer 7.

The use of the carbon fiber as the conductive carbon fiber to utilize excellent mechanical properties (for example, specific intensity and specific modulus) and conductive property of the carbon fiber ensures further reducing the increase in contact resistance with the separator 3 while enhancing the strength of the diffusion layer substrate 71.

While the embodiment of the present disclosure has been described in detail above, the present disclosure is not limited thereto, and can be subjected to various kinds of changes in design without departing from the spirit and scope of the present disclosure described in the claims.

DESCRIPTION OF SYMBOLS

1 Cell for fuel cell
2 Membrane Electrode & Gas Diffusion Layer Assembly (MEGA)
3 Separator
4 Membrane Electrode Assembly (MEA)
6 Electrode
7 Gas diffusion layer
71 Diffusion layer substrate
72 Water-repellent layer

What is claimed is:

1. A gas diffusion layer disposed in contact with a separator including a grooved fluid flow passage,
    wherein the gas diffusion layer comprises:
        a diffusion layer substrate that has a ratio of a pore diameter to a thickness of 0.35 or more,
        wherein, in the diffusion layer substrate,
            a ratio of a normal air permeability to an in-plane air permeability is $45 \times 10^6$ or more,
            the diffusion layer substrate includes a conductive carbon fiber, and
            a content rate of the conductive carbon fiber is 30% or more.

2. The gas diffusion layer disposed in contact with a separator including a grooved fluid flow passage according to claim 1,
    wherein the conductive carbon fiber is a carbon paper or a carbon cloth.

3. A fuel cell comprising the gas diffusion layer disposed in contact with a separator including a grooved fluid flow passage according to claim 1.

* * * * *